UNITED STATES PATENT OFFICE.

JAMES H. SMITH, JR., OF RUTHERFORD, AND CLARENCE A. WILSON, OF PASSAIC, NEW JERSEY.

COMPOSITION OF MATTER.

1,398,979.     Specification of Letters Patent.     Patented Dec. 6, 1921.

No Drawing.     Application filed November 8, 1919. Serial No. 336,697.

*To all whom it may concern:*

Be it known that we, JAMES H. SMITH, Jr., and CLARENCE A. WILSON, both citizens of the United States, and respectively residing at Rutherford, county of Bergen, State of New Jersey, and Passaic, in the county of Passaic and State of New Jersey, have invented certain new and useful Improvements in Composition of Matter, of which the following is a specification.

Our present invention relates to a new composition of matter adapted to many different uses, but more particularly to be used for mending or repairing rubber and rubber-like articles.

The new composition is a compound made of rubber, a rubber solvent and a small percentage of a ketone, preferably acetone, while the solvent is preferably carbon di-sulfid. Mixed with the solvent may be a minimum quantity of an adjuvant. The rubber used in our compound is a non-vulcanized rubber, preferably Pará rubber.

The process of making this new composition or compound is most simple. We dissolve a quantity of the non-vulcanized rubber, preferably cut in small pieces, in a suitable quantity of a rubber-solvent, preferably carbon disulfid, while agitating the mass thereby expediting the action of the solvent on the rubber. Then, after the rubber has been completely dissolved, we add to it a small amount of a ketone, preferably acetone and keep the container closed air-tight.

We have found that the following proportions of the constituents of our new compound give the best results:

Rubber _____ 1 lb
Solvent (*e. g.* carbon di-sulfid) ____ 1 gallon
Keytone (*e. g.* acetone) _____ 2%

Of course, these proportions can be varied. For instance, where a heavier product is desired, a larger quantity of rubber is used. The product is a semi-liquid paste. When in contact with air, it quickly starts to congeal and gradually solidifies, there occurring a rapid evaporation of the keytone (acetone) involving a temporary great drop in temperature. When entirely solidified, the compound forms a rubber-like mass as flexible and as soft as vulcanized rubber and capable of being stretched without showing the least tendency to tear. When poured over rubber, it very firmly and very tenaciously adheres thereto offering great resistance to being separated therefrom. Thus, it can be readily used to form patches, the great advantage being that in contact with air it completely solidifies in from fifteen to twenty minutes, while vulcanization requires from one to two hours, not to mention the amount of work used in vulcanization.

Our new product can be filled into compressible tubes, from which, after the cap has been removed, it is squeezed out like any other semi-liquid paste. But, of course, larger containers may be used for the new compound, only that they must be air-tight to prevent access of air and the resulting evaporation of the keytone.

As already stated, in addition to the solvent, a minimum quantity of an adjuvant may be used.

We claim as our invention:

1. A composition of matter comprising non-vulcanized rubber, a solvent of rubber, and a small amount of acetone.

2. A composition of matter comprising non-vulcanized rubber, carbon di-sulfid, and a small amount of acetone.

3. A composition of matter comprising non-vulcanized rubber, a solvent of rubber, and a keytone in the following proportions: 1 lb. of rubber, 1 gallon of solvent, 2% of acetone.

In testimony whereof we affix our signatures in the presence of two witnesses.

JAMES H. SMITH, JR.
      CLARENCE A. WILSON.

Witnesses:
   M. COLVIN,
   W. A. WILSON.